Feb. 9, 1943. J. GALAMB 2,310,416
BRACKET
Filed April 14, 1941

INVENTOR.
Joseph Galamb
Edwin C. McRae
BY Robert F. Harris
ATTORNEYS.

WITNESS
William Jilly

Patented Feb. 9, 1943

2,310,416

UNITED STATES PATENT OFFICE 2,310,416

BRACKET

Joseph Galamb, Detroit, Mich., assignor to Ford Motor Company, Dearborn, Mich., a corporation of Delaware Application April 14, 1941, Serial No. 388,557

2 Claims. (Cl. 296—57)

This invention relates to automotive accessories; and, more particularly, to a combined rear light and license bracket for use on certain types of vehicles.

One such vehicle upon which this bracket may be used is of the type known as the station wagon which is generally provided with a tail gate hinged at the level of the floor of the vehicle. Other vehicles upon which it might be used would include such trucks, delivery cars, etc., as are equipped with rear tail gates or doors. In the case of the station wagon, the tail gate when closed is in an upright position and forms a part of the back of the station wagon body. The upper part of the station wagon body is usually a window which is hinged at its upper edge to the roof of the body and may be opened for purposes of ventilation.

In earlier designs, the rear light and license bracket was generally mounted on one of the rear fenders of the vehicle. With later models, due to the streamlining of the body and its increase in breadth with relation to the tread of the vehicle, the width of the fender has so decreased that it is no longer feasible to mount the light and license bracket in that position as the license would extend beyond the side of the fender. It is obvious that the bracket cannot be fixedly mounted on the tail gate, for while this could be arranged in a satisfactory position either while the gate was closed or when it was opened, it would not be satisfactory for both since the light and license would be obscured in one or the other position.

Nor is that portion of the body above the tail gate a satisfactory location, for if this portion is fixed, wiring difficulties are encountered and the amount of window available for rear vision is lessened. In such cases where this upper part is also hinged, the same difficulties are met with as in the case of a mounting on a tail gate.

Therefore, it is an object of this invention to devise a means by which a taillight and license bracket may be mounted on a tail gate or door so that the light and license will be fully visible without respect to the position of the tail gate or door.

It is a further object to provide such a light and license bracket which is fully automatic in operation and responsive to the position of the tail gate alone. Another object is to devise a bracket which is effective not only for the fully opened and fully closed position of the tail gate, but for all intermediate positions as well.

A final object is to obtain a device whose durability, quietness and cheapness of construction compares favorably with that of conventional fixed brackets; and by whose use the license and rear light may be mounted in the most suitable place on the tail gate of a body such as that of a station wagon and will be fully visible without respect to the position of such tail gate.

With these and other objects in view, my invention consists in the arrangement, construction and combination of the various parts of my improved device, as described in this specification, claimed in my claims and illustrated in the accompanying drawing, in which:

Figure 1:
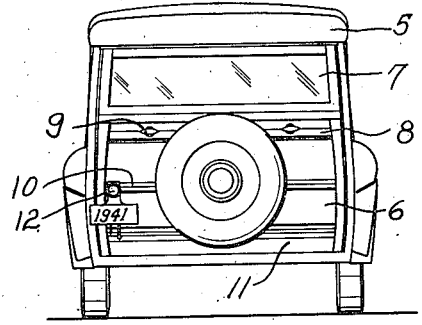
Figure 1 is a rear elevation of a vehicle with the bracket of this invention in place.

Referring to Figure 1, the rear elevation of a motor vehicle is shown, indicated generally as 5, this being of the body type known as the station wagon which has a tail gate 6 hinged to swing downwardly and a rear window 7 hinged to swing upwardly. The tail gate 6 is reinforced by the top bar 8 which also carries the latching means 9 by which the tail gate is releasably maintained in position, the center bar 10, and the bottom bar 11. The rear light and license bracket indicated generally as 12 is secured to the center bar.

Figure 2:
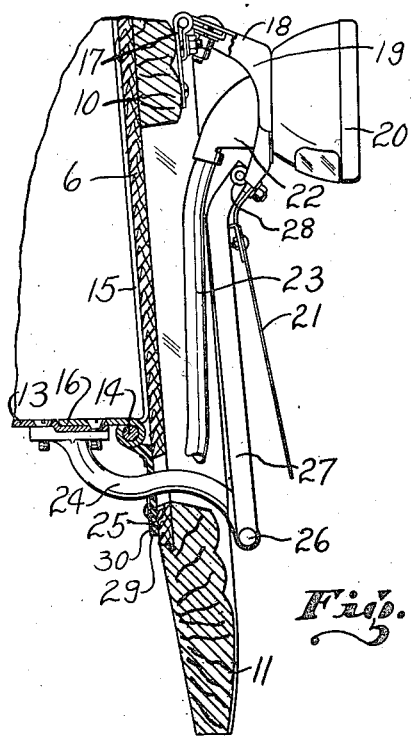
Figure 2 is a transverse section through the tail gate of the vehicle shown in its closed position.

Figure 2 shows the bracket assembly 12 in position when the tail gate 6 is closed. The tail gate is hinged to the body floor 13 at pivot 14, the male hinge being extended to form the re-enforcing strap 15 and the female hinge 16 being secured to the floor 13. It will be noted that this hinge point is intermediate of the top and bottom of the tail gate in this instance, although the invention applies equally when the tail gate is hinged at its bottom edge. Secured to the center bar 10 of the tail gate is the female bracket hinge 17, and engaged therewith the male bracket hinge 18. The bracket 19 is secured to the latter and to it are attached the rear light 20 and the license plate 21 in the usual manner. The taillight assembly includes the wire shield 22 and its cable connection 23.

Fixed to the lower side of the floor 13 is the link bracket 24 which extends through an elongated hole 25 in the tail gate. Pivotally attached to the link bracket at 26 is the link 27 which is also pivotally attached to the bracket 19 at upper pivot 28. In the embodiment shown, the pivot 28 is located on one side of the bracket 19 in order to clear the cable 23 which leads from the center of the light disposed on the bracket.

Figure 3:
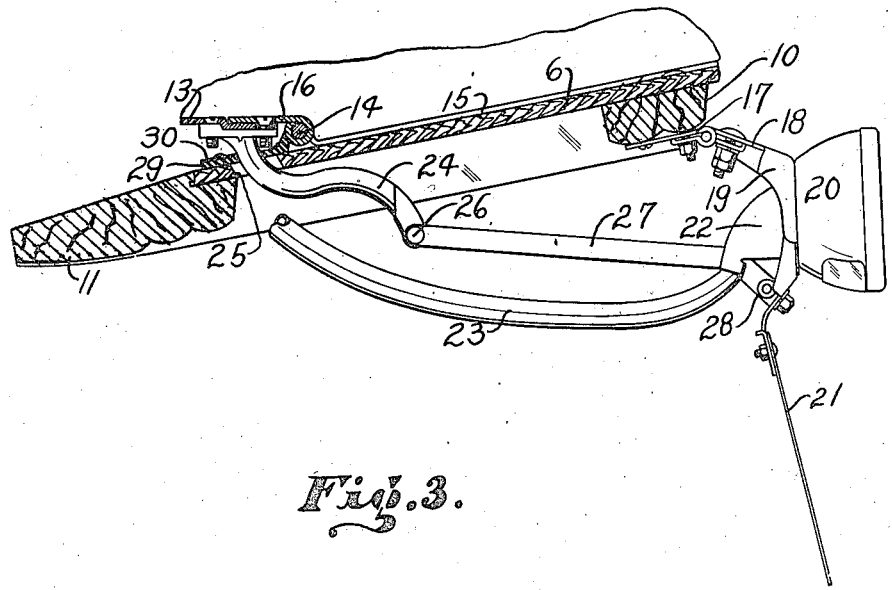
Figure 3 is a similar transverse section, the tail gate in this view being shown in the open position.

Comparison of Figures 2 and 3 will show how the device operates. In the closed position of Figure 2, the effective length of the link 27 is decreased and, as a result, the bracket is drawn downwardly and the rear light and license plate are held parallel to the tail gate. When the tail gate is lowered as in Figure 3, the effective length of the link is increased, and the light and license plate are pushed outwardly and assume a position substantially perpendicular to that of the tail gate. It follows that in either position of the tail gate, the rear light and license will be visible.

It will be noted that the bracket hinge parts 17 and 18 are of the open type, that is, the pivot loop is open and is secured in place by one of the bolts holding the hinge to the bar or bracket as the case may be. By using this construction, greater holding pressure may be applied to the hinge parts and any wear thereof may be compensated. An elongated hole through which the link brackets extend is protected by suitable weather-stripping material 29 secured in place by a thin metal retainer plate 30.

I have thus evolved a bracket for the rear light and license plate of a motor vehicle having a tail gate, which is so constructed that the light and license plate will always occupy a visible position without respect to the position of the tail gate. This operation, moreover, is automatic in that the position of the light and license plate is directly dependent upon the relative position of the tail gate. This bracket has the further advantage that it is effective to position the light and license plate correctly not only when the tail gate is in the extreme open or closed position, but also at any intermediate position at which the gate may be held.

The construction and combination of the parts comprising the bracket is extremely sturdy and economical to manufacture and assemble. The component parts have been so chosen that the device will not develop rattles or other noises, even after long wear. Inspection of Figure 1 will show why it is no longer possible to place the rear light and license on the fender; and how, by the use of this device, these parts may be placed in position where they will be most visible and best protected from damage. It will be understood, of course, that if desired a similar light might be placed on the other side of the tail gate if such is required for signalling or warning purposes.

While this bracket has been shown in connection with the tail gate of the station wagon, it will be understood that it is equally applicable to any vehicle in which a swinging gate or door is used. Nor is it limited to cases in which a door swings about a horizontal axis but is applicable to those in which the axis is vertical, as will be readily apparent from Figures 2 and 3. Thus, the bracket of my invention may be used in connection with any swinging gate or door in any type of body or other installation. Although it is shown in connection with an automobile body, it is apparent that it may find other uses in connection with other types of doors or apparatus.

Some changes may be made in the arrangement, construction and combination of the various parts of my improved device without departing from the spirit of my invention and it is my intention to cover by my claims such changes as may be reasonably included within the scope thereof.

I claim as my invention:

1. In combination, in a motor vehicle, a body including a floor member and a solid tail gate, said tail gate being hingedly secured to said floor member intermediate the top and bottom of said gate, a combined rear light and license plate bracket hingedly secured to the outer face of said tail gate above said hinge, a link bracket fixedly secured to the underside of said floor member adjacent said hinge, said link bracket extending downwardly and outwardly from said floor member and transversing said tail gate, and a link pivotally secured to the lower end of said bracket and to the outer end of said link bracket, whereby operation of said tail gate causes the said rear light and license bracket to occupy successive substantially parallel planes and whereby said rear light and license plate is maintained in visible position in any position of said tail gate.

2. In combination, in a motor vehicle, a body including a floor member and a solid tail gate, said tail gate being hingedly secured to said floor member intermediate of the top and bottom of said gate, a combined rear light and license plate bracket hingedly secured at its upper end to the outer face of said tail gate above said first hinge, a link bracket fixedly secured to the underside of said floor member adjacent to said hinge and within said gate, said link bracket extending downwardly and outwardly from said floor member and transversing said gate, a link pivotally secured to the lower end of said light and license plate bracket and to the outer end of said link bracket, said pivot point of said link bracket and link being disposed beneath and outwardly of said first hinge, said link lying wholly without said gate.

JOSEPH GALAMB.